Aug. 18, 1936.  E. L. DICK  2,051,684
WEED EXTERMINATOR
Filed Dec. 4, 1934
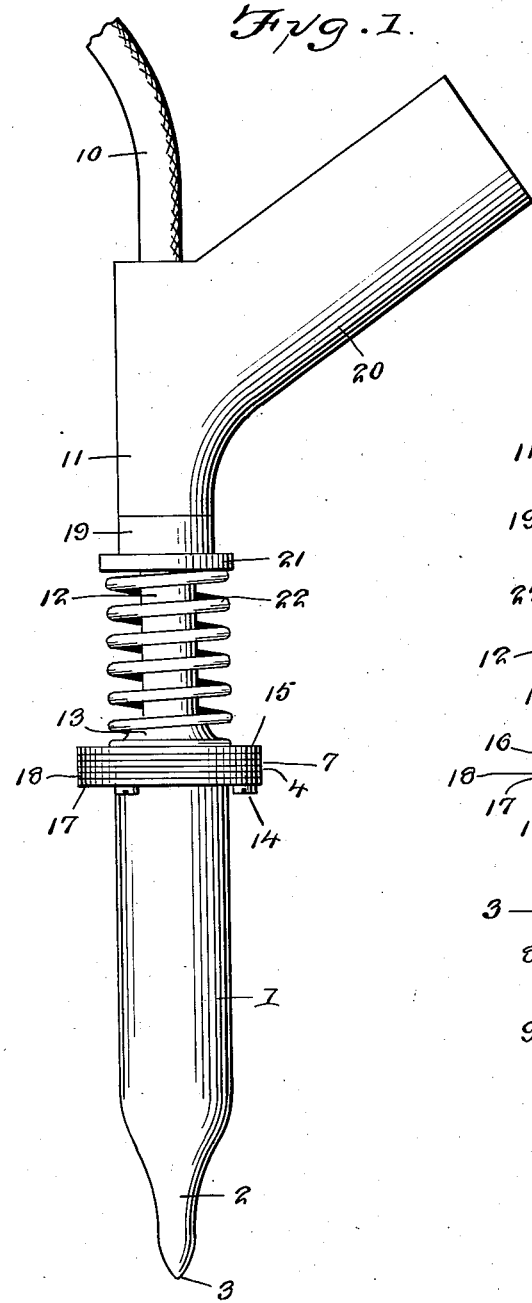
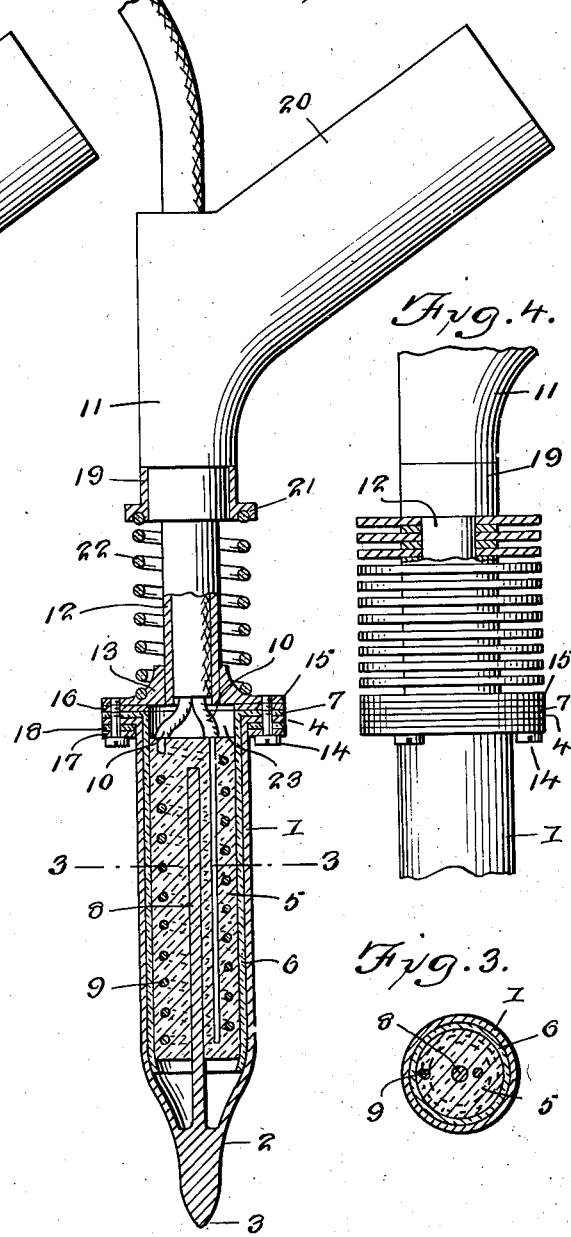
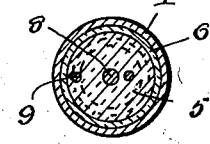
Este L. Dick
INVENTOR
BY Victor J. Evans & Co.
ATTORNEY Patented Aug. 18, 1936

2,051,684

UNITED STATES PATENT OFFICE 2,051,684

WEED EXTERMINATOR

Este L. Dick, Great Falls, Mont.

Application December 4, 1934, Serial No. 755,971

2 Claims. (Cl. 219—29)

This invention relates to weed exterminators and its general object is to provide an electrically heated tool that is primarily designed for use in burning the roots of weeds to assure complete destruction thereof, as the head or iron portion of the tool is shaped to provide a penetrating point that can be easily and expeditiously inserted into the center of the weed to penetrate its root.

Another object of the invention is to provide a weed exterminator in the form of an electrically heated tool, that includes a handle and a head or iron portion, with means for connecting the same together, in a manner to prevent radiation of heat from the iron portion to the handle, so that the latter will be retained in a cool condition regardless of the time the tool is in use.

Another object of the invention is to provide a weed exterminator that includes a handle which is not only retained free from heat, but is arranged with respect to the head or iron portion of the tool, whereby the tool can be easily directed and conveniently used without fear of burning plants and grass adjacent to the weed to be destroyed.

A further object of the invention is to provide a weed exterminator that includes an electrically heated head having a tip and means for directing heat to the tip so that the heat will be concentrated therein.

A still further object of the invention is to provide a weed exterminator in the form of an electrically heated tool, that is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevation of the tool which forms the subject matter of the present invention.

Figure 2 is a similar view with parts in section.

Figure 3 is a sectional view taken approximately on the line 3—3 of Figure 2.

Figure 4 is a fragmentary view illustrating a modified form of cooling means.

Referring to the drawing in detail, the reference numeral 1 indicates a substantially cylindrical shaped metallic shell which is hollow for the major portion of its length and is provided with a closed end, the latter being tapered to provide a tip 2. The tip is solid and terminates into a penetrating point 3, as clearly shown in Figure 2. The shell 1 provides a part of the head or iron portion of the tool, and its upper end which is open has formed thereon an annular flange 4. A core 5 of insulating material is disposed within the shell 1, and arranged between the core 5 and the shell 1 is a sleeve 6 of suitable heat insulating material such as asbestos, so that heat from suitable heating means to be presently described will be confined within the core and directed toward the tip. The lower end of the sleeve following the taper of the shell for that purpose, and the upper end has formed thereon an annular flange 7 disposed to contact and overlie the flange 4.

The core 5 is provided with a bore that extends within the longitudinal axis thereof, to receive a stem 8 which is formed on and rises from the tip 2, with the result it will be seen that the stem has a tendency to direct the heat to the tip, therefore by use of the stem 8 and the asbestos sleeve 6 the tip 2 is not only quickly heated, but will be retained in a heated condition with minimum consumption of current.

The core 5 is likewise provided with a longitudinally disposed bore, and a spirally arranged passageway to receive a heat wire 9 that extends through the last mentioned bore, and which is electrically connected to conductors 10, the latter being provided with a suitable covering of insulating material. The conductors 10 extend through the handle of the tool in a manner which will be presently described.

The handle of the tool includes a body 11 having a bore centrally arranged therethrough and secured in the bore as well as depending therefrom is a relatively narrow sleeve 12 which has secured to its lower end a flanged collar 13 having threaded openings arranged therein to be aligned with openings in the flanges 4 and 7 for the purpose of receiving screw bolts 14 for securing the handle portion of the tool to the head or iron portion thereof.

The flange 15 of the collar 13 is spaced from the flange 7 through the instrumentality of a ring member 16. A ring member 17 is also provided in the means for connecting the head of the tool with the handle portion thereof, and disposed between the ring member 17 and the flange 4 of the shell 1 is a gasket 18 that is formed from asbestos or the like.

The body of the handle may be provided with a ferrule 19 disposed about the lower end thereof, but in any event the body has formed thereon and extending therefrom an upwardly inclined gripping portion 20, whereby the tool can be easily directed and conveniently used with very little effort on the part of the operator.

In Figures 1 and 2 it will be noted that the ferrule 19 has extending outwardly therefrom a flange 21 provided with an annular groove for the purpose of receiving the upper convolution of a coiled member which is preferably a coil spring 22, while the lower convolution is received in an annular groove arranged in the upper surface of the flanged collar 13. By this arrangement, the coil spring surrounds the sleeve 12, and is adapted to direct the heat off in space away from the handle. It will be apparent that considerable space is provided between the handle and the head of the tool, due to the small diameter and length of the sleeve 12 that connects the same, and such space may be termed a ventilation space, in that air circulates about the sleeve and cools the air rising from the head, therefore the space cooperates with the coiled member, in retaining the handle in a cooled condition. A dead air space 23 is provided between the core 5 and the collar 13, which also acts to prevent the handle from becoming heated.

In Figure 4 I have illustrated a modified form of cooling means which is in the form of a plurality of alternately arranged small and large washers, so that the large washers provide annular cooling fins 24. These washers are secured about the sleeve 12 and are held accordingly by the lower washer contacting the upper edge of the flanged collar 13, while the upper washer is engaged by the ferrule 19. The remaining structure as shown in Figure 4 is identical with that previously described.

From the above description and disclosure in the drawing, it will be obvious that the conductors have secured thereto, any suitable connecting means for connecting the tool with a source of electric current, to supply current to the heat wire 9, whereby the tip 2 will be amply heated as has been previously set forth.

In the use of the tool, it is connected to the source of current as above set forth, and when the tip 2 becomes hot it is inserted in the root of a weed for a few seconds. This action will result in complete destruction of the weed as the root thereof is burned, therefore it will be seen that weeds can be destroyed in an easy and expeditious manner with very little effort on the part of the user.

A suitable switch may be employed for controlling the passage of current to the heat wire 9 and this switch may be arranged on the gripping portion 20 of the handle, or any place in convenient reach of the operator, during the use of the tool.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A weed exterminator comprising a head including a hollow cylindrical shaped metallic shell, a solid tip formed on one end of the shell and terminating into a penetrating point, electrical heating means within the shell and including a core, a heat wire embedded in the core, a handle including a body, a sleeve extending from the body, conductors for the heat wire and extending through the sleeve and body, a flanged collar secured to the sleeve, means for detachably securing the shell to the collar with the core spaced from the collar to provide a dead air space between the handle and head, said sleeve being relatively long and narrow to provide a ventilating space between the handle and head, and a gripping portion extending at an upward angle from the body.

2. A weed exterminator comprising a head including a cylindrical shaped metallic shell, a solid tip formed on the shell and extending into a penetrating point, an annular flange formed on the upper end of the shell, heating means disposed within the shell, a handle for the head and including a body, a relatively long narrow sleeve extending from the body, a flanged collar secured to the lower end of the sleeve, means for detachably securing the annular flange to the flanged collar, heat resisting means surrounding the heating means and extending between the annular flange and the flange of the collar, and said heating means being spaced from the collar to provide a dead air space between the handle and the head and cooling means surrounding the sleeve and cooperating with the dead air space to retain the handle in cooled condition.

ESTE L. DICK.